(12) United States Patent
Price et al.

(10) Patent No.: US 9,428,597 B2
(45) Date of Patent: Aug. 30, 2016

(54) SOLUTION POLYMERIZATION PROCESSES WITH REDUCED ENERGY USAGE

(71) Applicant: NOVA Chemicals (International) S.A., Fribourg (CH)

(72) Inventors: Terri A Price, Calgary (CA); Fazle Sibtain, Calgary (CA); Eric Cheluget, Prospect Heights, IL (US)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/771,355

(22) PCT Filed: Mar. 4, 2014

(86) PCT No.: PCT/CA2014/000160
§ 371 (c)(1),
(2) Date: Aug. 28, 2015

(87) PCT Pub. No.: WO2014/138854
PCT Pub. Date: Sep. 18, 2014

(65) Prior Publication Data
US 2016/0002370 A1    Jan. 7, 2016

(30) Foreign Application Priority Data
Mar. 15, 2013 (CA) ........................ 2809718

(51) Int. Cl.
*C08F 10/02* (2006.01)
*C08F 2/06* (2006.01)
(Continued)

(52) U.S. Cl.
CPC ............ *C08F 10/02* (2013.01); *C08F 6/003* (2013.01); *C08F 6/02* (2013.01); *C08J 11/02* (2013.01)

(58) Field of Classification Search
CPC .............. C08F 2/01; C08F 2/06; C08F 6/02; C08F 6/10
USPC ............................................. 526/67
See application file for complete search history.

(56) References Cited

U.S. PATENT DOCUMENTS 4,105,609 A    8/1978  Machon et al.
4,379,882 A    4/1983  Miyata
(Continued)

OTHER PUBLICATIONS

Kissin, Yury V.; Polyethylene, Linear Low Density; Kirk-Othmer Encyclopedia of Chemical Technology, Copyright John Wiley & Sons, Inc.—published on-line Apr. 15, 2005.
(Continued)

*Primary Examiner* — Fred M Teskin
(74) *Attorney, Agent, or Firm* — Lawrence T. Kale

(57) ABSTRACT

An improved solution polymerization process wherein energy consumption is reduced comprising: i) injecting ethylene, solvent, catalyst, α-olefins and hydrogen into at least one reactor to produce a polyethylene in a single liquid phase solution; ii) deactivating the single liquid phase solution; iii) passing the deactivated solution into a vapor/liquid separator forming a bottom stream of polyethylene rich solvent and a gaseous overhead stream; iv) passing not more than 40% of the gaseous overhead stream to distillation; v) condensing the remainder of the gaseous overhead stream to form a recycle stream, while generating low pressure steam; vi) passing the recycle stream through a means for oligomer removal; vii) passing the recycle stream through a lights separator; viii) passing the recycle stream through a purification step; ix) collecting the recycle stream in a recycle drum, passing the recycle stream through a pump and injecting a high pressure recycle stream into said reactors.

31 Claims, 3 Drawing Sheets

(51) Int. Cl.

| | |
|---|---|
| *C08F 6/02* | (2006.01) |
| *C08F 6/06* | (2006.01) |
| *C08F 6/10* | (2006.01) |
| *C08J 11/02* | (2006.01) |
| *C08F 6/00* | (2006.01) |

(56) References Cited

U.S. PATENT DOCUMENTS

| | | |
|---|---|---|
| 4,731,438 A | 3/1988 | Bernier |
| 4,803,259 A | 2/1989 | Zboril et al. |
| 5,434,116 A | 7/1995 | Sone et al. |
| 5,554,775 A | 9/1996 | Krishnamurti et al. |
| 5,589,555 A | 12/1996 | Zboril et al. |
| 5,637,659 A | 6/1997 | Krishnamurti et al. |
| 6,180,730 B1 | 1/2001 | Sibtain et al. |
| 8,101,693 B2 | 1/2012 | Van Asseldonk et al. |

OTHER PUBLICATIONS

Chemical Processing Expert Forums: Steam and Thermal Systems—Topic: Re: How do you define steam?—http://www.chemicalprocessing.com/experts/steam-thermal-systems/show/359/—Apr. 5, 2016—p. 1 of 6.

US 9,428,597 B2

SOLUTION POLYMERIZATION PROCESSES WITH REDUCED ENERGY USAGE

TECHNICAL FIELD

This invention relates to an improved solution polymerization process wherein the energy consumed is reduced. As the inventive solution polymerization plant is producing polyethylene, energy savings are realized in the following utilities; reduced low pressure steam use, reduced high pressure steam use and reduced power consumption. More specifically, as a gaseous overhead stream of process solvent (primarily) is recycled, low pressure steam is generated during a condensation step; as a result, the solution polymerization plant becomes a net exporter of low pressure steam or energy. This exported energy can be utilized in other petrochemical operations within an integrated complex.

BACKGROUND ART

The continuous solution polymerization process is well known. Y. V. Kissin, in The Kirk-Othmer Encyclopedia of Chemical Technology, in an article titled "Polyethylene, Linear Low Density" briefly describes commercial solution polymerization processes (published on-line 15 Apr. 2005). In the solution process, solvent, monomer(s) and catalyst are continuously fed to a reactor. The reactor can be operated over a relatively wide range of temperatures and pressures; with the goal of producing a single liquid phase containing the desired polymer. Downstream of the reactor, the single liquid phase is phase separated to recover the solvent, unreacted ethylene and α-olefins (if present) from the polymer. In the phase separation step, a vapor/liquid (hereafter V/L) separator operating at lower pressure, relative to the reactor(s), generates: a gaseous overhead stream of solvent, monomers, hydrogen (if present), light-end impurities and possibly some low molecular weight oligomers ("grease"), and; a bottom stream of a polymer rich solution. The gaseous overhead stream is typically treated to separate the components, and various processes have been suggested to accomplish this separation, for example, a distillation process. However, distillation is energy intensive and thus costly. Thus, it is desirable to recycle a major portion of the gaseous overhead stream to the upstream reactor(s), in an energy conserving manner.

In general, the solution polymerization process is an energy intensive process. For example, relative to gas phase polymerization reactors, the solution polymerization reactor(s) run hotter and at higher pressures, consuming more energy, i.e., utilities such as steam and power. A need exits to improve the energy efficiency of the continuous solution polymerization process. This invention describes embodiments of a continuous solution polymerization process that consumes less energy, relative to a base case solution polymerization plant. Because less energy is consumed, manufacturing variable costs are reduced and the environment benefits, e.g., reduced greenhouse gas emissions.

DISCLOSURE OF INVENTION

The present invention provides an improved continuous solution polymerization process wherein energy consumption is reduced, comprising the following steps;

i) injecting ethylene, one or more aliphatic hydrocarbon solvents, a catalyst, optionally one or more α-olefins and optionally hydrogen into at least one upstream reactor operating at a temperature and pressure to produce an ethylene polymer in a single liquid phase solution;

ii) injecting a catalyst deactivator, downstream of said upstream reactors, into the single liquid phase solution containing ethylene, solvents, catalyst, ethylene polymer, optional α-olefins and optional hydrogen, to form a deactivated reactor solution;

iii) passing the deactivated reactor solution through a heat exchanger to increase the temperature, followed by reducing the pressure, followed by producing a bottom stream of ethylene polymer rich solvents, deactivated catalyst and optional α-olefins and a gaseous overhead stream of ethylene, solvents, oligomers, optional α-olefins, and optional hydrogen in a V/L separator;

iv) passing not more than 40% of the gaseous overhead stream to a distillation column;

v) passing the remainder of the gaseous overhead stream through a halide removal column, followed by condensing the gaseous overhead stream by reducing the temperature, to form a condensed overhead stream;

vi) passing the condensed overhead stream through a means for oligomer removal, producing a cold recycle stream;

vii) passing the cold recycle stream through a lights separator to remove volatile components to produce a purged recycle stream;

viii) passing the purged recycle stream through at least two purification vessel, producing a purified recycle stream;

ix) collecting the purified recycle stream in a recycle drum, passing the purified recycle stream through pump and injecting a high pressure recycle stream into said upstream reactors.

The present invention further provides a process wherein the heat recovered during the condensing step v) is used to generate low pressure steam.

The present invention further provides a process wherein the low pressure steam generated is exported from the continuous solution polymerization process and used in petrochemical operations within an integrated complex.

The present invention further provides a process wherein the up stream reactors are operated at a temperature from 100° C. to 300° C.

The present invention further provides a process wherein the up stream reactors are operated at pressures from 3 MPa to 45 MPa.

The present invention further provides a process wherein the solvent used in the continuous solution polymerization process is one or more of $C_{5-12}$ alkanes.

The present invention further provides a process wherein an optional comonomer is selected from the group consisting of 1-butene, 1-pentene, 1-hexene and 1-octene.

The present invention further provides a process wherein the catalyst used to polymerize the ethylene and optional comonomer is a heterogeneous catalyst.

The present invention further provides a process wherein the catalyst used to polymerize the ethylene and optional comonomer is a homogeneous catalyst.

The present invention further provides a process wherein single or multiple solution reactors are utilized and the catalysts used in each reactor may be the same or different; non-limiting examples of suitable catalysts include heterogeneous and homogeneous catalysts.

DEFINITION OF TERMS

Other than where otherwise indicated, all numbers referring to process conditions (temperature, pressure, etc.), quantities of ingredients, etc., used in the specification and claims are to be understood as modified in all instances by the term "about." Accordingly, unless indicated to the contrary, the numerical parameters set forth in the following specification and attached claims are approximations that can vary depending upon the raw materials used or the desired product the present invention desires to produce. At the very least, and not as an attempt to limit the application of the doctrine of equivalents to the scope of the claims, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In order to form a more complete understanding of the invention, the following terms are defined and should be used with the accompanying figures, the detailed description of the various embodiments and the claims.

As used herein, the term "monomer" refers to a small molecule that may chemically react and become chemically bonded with itself or other monomers to form a polymer. Non-limiting examples of monomers include ethylene (ethene), propylene (propene) and $C_4$ to $C_{12}$ α-olefins.

As used herein, the term "polymer" refers to a macromolecule composed of one or more monomers connected together by covalent chemical bonds. The term polymer is meant to encompass, without limitation, homopolymers (containing one type of monomer), copolymers (containing two monomer types), terpolymers (containing three monomer types) and quatropolymers (containing four monomers types), etc.

As used herein, the term "ethylene polymer", refers to polymers produced from the ethylene monomer and optionally one or more additional monomers. The term ethylene polymer is meant to encompass, ethylene homopolymers, ethylene copolymers, ethylene terpolymers and ethylene quatropolymers, etc.; produced using a continuous solution polymerization process using any catalyst. Other commonly used terms to describe ethylene polymers include, but are not limited to, high density polyethylene (HDPE), medium density polyethylene (MDPE), linear low density polyethylene (LLDPE), very low density polyethylene (VLDPE), ultralow density polyethylene (ULDPE), plastomer and elastomers.

The term "heterogeneously branched ethylene polymer" or "heterogeneous ethylene polymer" refers to a subset of the ethylene polymer group that are produced using a Ziegler-Natta catalyst or chromium catalyst.

The term "homogeneously branched ethylene polymer" or "homogeneous ethylene polymer" refers to a subset of the ethylene polymer group that are produced using a single site catalyst or metallocene catalyst. It is well known to those skilled in the art, that the homogeneous ethylene polymer group is frequently further subdivided into "linear homogeneous ethylene polymer" and; "substantially linear homogeneous ethylene polymer". These two subgroups differ in the amount of long chain branching. More specifically, linear homogeneous ethylene polymers have an undetectable amount of long chain branching; while substantially linear ethylene polymers have a small amount of long chain branching, typically from 0.01 long chain branches/1000 carbons to 3 long chain branches/1000. A long chain branch is defined as a branch having a chain length that is macromolecular in nature, i.e., the length of the long chain branch can be similar to the length of the polymer back-bone to which it is attached. In this invention, the term homogeneous ethylene polymer includes both linear homogeneous ethylene polymers and substantially linear homogeneous ethylene polymers.

As used herein, the term "oligomers", refers to an ethylene polymer of low molecular weight, e.g., an ethylene polymer with a weight average molecular weight (Mw) of about 2000 to 3000 daltons. Other commonly used terms for oligomers include "wax" or "grease". In a solution polymerization process the presence of oligomers in the process solvent can be problematic, e.g., oligomers may deposit on and foul heat transfer surfaces.

As used herein, the term "light-end impurities", refers to chemical compounds with relatively low boiling points that may be present in the various vessels and process streams within a continuous solution polymerization plant; non-limiting examples include, methane, ethane, propane, butane, nitrogen, $CO_2$, chloroethane, HCl, etc.

BEST MODE FOR CARRYING OUT THE INVENTION

Two embodiments of the present invention will be described in conjunction with FIGS. 2 and 3. The comparative, or base case continuous solution polymerization process is shown in FIG. 1.

Figure 1:
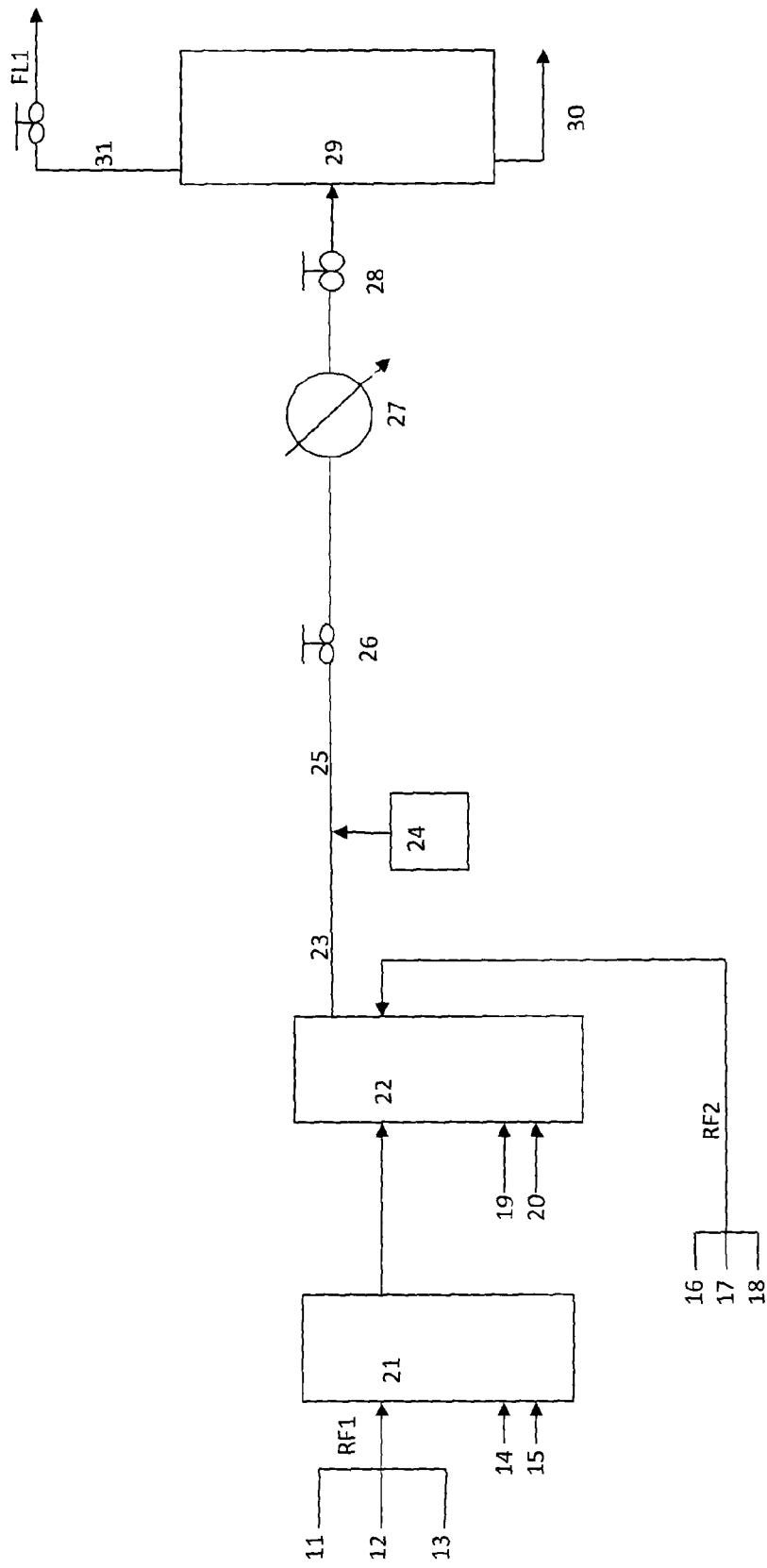
FIG. 1 is a schematic of a non-inventive base case continuous solution polymerization process where a gaseous overhead stream 31, containing solvent, ethylene, oligomers, optional α-olefins, optional hydrogen and light-end impurities flow to a distillation train.

In FIG. 1, solvent 11, ethylene 12 and optional α-olefin 13 are combined to produce reactor feed RF1, which is injected into reactor 21. A variety of solvents are suitable for solution polymerization processes. Non limiting examples include linear or branched $C_5$ to $C_{12}$ alkanes. Non limiting examples of α-olefins include 1-butene, 1-pentene, 1-hexene and 1-octene. Catalyst is injected into reactor 21 through line 14. The catalyst used is not especially important to the success of this invention, non-limiting examples of suitable catalyst are described below. Optionally hydrogen 15 may be injected into reactor 21; in general, hydrogen is added to terminate propagating polymer chains, i.e. as an agent to control the molecular weight of the ethylene polymer produced.

The continuous solution polymerization process in FIG. 1 shows two reactors, reactor 21 and reactor 22. The shape, design or the number of the reactor(s) is not particularly important to the success of this invention. For example, unstirred or stirred spherical, cylindrical or tank-like vessels could be utilized, as well as recirculating loop reactors or tubular reactors. As shown in FIG. 1, fresh feeds are also injected into reactor 22. Solvent 16, ethylene 17 and optional α-olefin 18 are combined to produce reactor feed RF2 which is injected into reactor 22. Catalyst is injected into reactor 22 through line 19. Optionally hydrogen 20 may be injected into reactor 22.

Depending on the catalyst employed and the ethylene polymer produced, the operating temperature of reactor 21 and 22 can vary over a wide range. For example, the upper limit on reactor temperature may be 300° C., in some cases 280° C., and in other cases 260° C.; and the lower limit on reactor temperature may be 80° C., in some cases 100° C., and in other cases 125° C. Typically, reactor 22 (the second reactor) is operated at a slightly higher temperature than reactor 21; e.g. reactor 22 is typically 5° C. to 25° C. hotter than reactor 21. The reactor residence time is typically less than 15 minutes and in some cases less than 10 minutes. The operating pressure of reactor 21 and 22 can vary over a wide range. For example, the upper limit on reactor pressure may be 45 MPa, in some cases 30 MPa, and in other cases 20 MPa; and the lower limit on reactor pressure may be 3 MPa, in some cases 5 MPa, and in other cases 7 MPa.

The continuous solution polymerization reactors 21 and 22, shown in FIG. 1, produce stream 23 which contains an ethylene polymer in a single liquid phase solution (or two liquid phases). Stream 23 may also contain unreacted ethylene, active catalyst, deactivated catalyst, optional unreacted α-olefin, optional unreacted hydrogen and light-end impurities if present. Tank 24 contains a catalyst deactivator dissolved, or slurried, in a solvent; non-limiting examples of suitable solvents include linear or branched $C_5$ to $C_{12}$ alkanes. The catalyst deactivator substantially stops the polymerization reaction, by changing the active catalyst into an inactive form. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain). In general, the catalyst deactivator is added in the minimal amount required to substantially deactivate the catalyst and quench the polymerization reaction. A minimal amount of catalyst deactivator minimizes cost and minimizes the amount of un-reacted catalyst deactivator present in process streams.

Injection of the catalyst deactivator into the process produces a deactivated reactor solution, stream 25. Stream 25 passes through pressure let down device 26, heat exchanger 27, pressure let down device 28 and enters a V/L separator 29; V/L denotes "vapor/liquid". Prior to entering the V/L separator, the deactivated reactor solution may have a maximum temperature of 300° C., in some cases 290° C. and in other cases 280° C.; while the minimum temperature of the deactivated reactor solution prior to entering the V/L separator could be 150° C., in some cases 200° C. and in other cases 220° C. Prior to entering the V/L separator, the deactivated reactor solution may have a maximum pressure of 40 MPa, in some cases 25 MPa, and in other cases 15 MPa; while the minimum pressure could be 1.5 MPa, in some cases 5 MPa, and in other cases 6 MPa.

In the V/L separator two streams are formed: a bottom stream 30, comprised of an ethylene polymer rich solvent, deactivated catalyst and optional α-olefin, and; a gaseous overhead stream 31 comprised of ethylene, solvent, oligomers, optional α-olefins, optional hydrogen and light-end impurities if present. The V/L separator may be operated over a relatively broad range of temperatures and pressures. For example, the maximum operating temperature of the V/L separator may be 300° C., in some cases 285° C., and in other cases 270° C.; while the minimum operating temperature of the V/L separator may be 100° C., in some cases 140° C. and in other cases 170° C. The maximum operating pressure of the V/L separator may be 20 MPa, in some cases 10 MPa, and in other cases 5 MPa; while the minimum operating pressure of the V/L separator may be 1 MPa, in some cases 2 MPa, and in other cases 3 MPa. In FIG. 1, 100% of the gaseous overhead stream 31 is sent to a distillation train via line FL1, while ethylene polymer rich solvent 30 is sent to polymer recovery.

Figure 2:
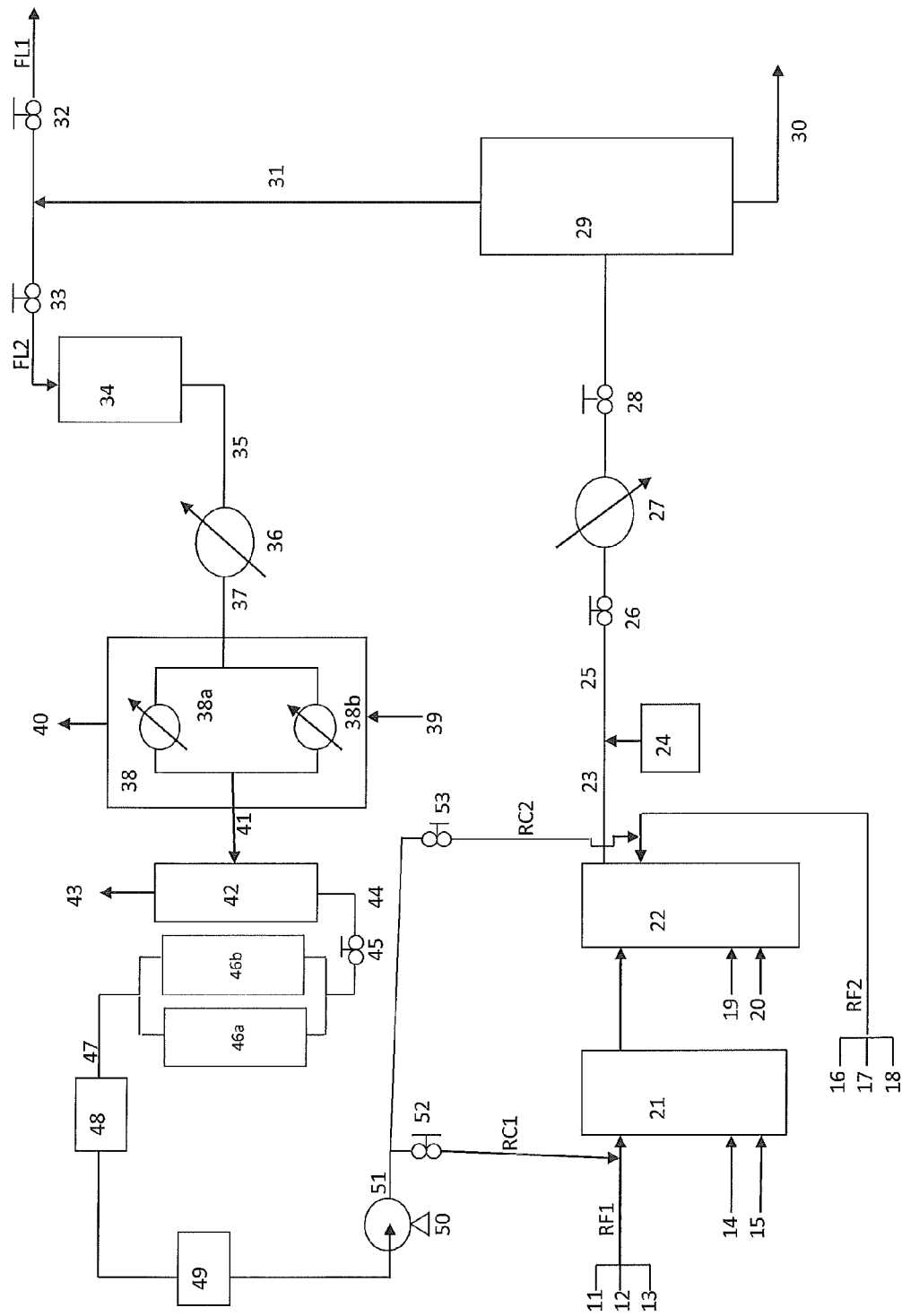
FIG. 2 is a schematic diagram of one embodiment of an inventive continuous solution polymerization process where a portion of the gaseous overhead stream 31 is recycled to at least one upstream polymerization reactor.

One embodiment of this invention is shown in FIG. 2. In FIG. 2 not more than 40% of the gaseous overhead stream 31 is sent to distillation via stream FL1.

In FIG. 2, solvent 11, ethylene 12 and optional α-olefin 13 are combined to produce reactor feed RF1, which is injected into reactor 21. Catalyst is injected into reactor 21 through line 14. Optionally hydrogen 15 may be injected into reactor 21.

The continuous solution polymerization process in FIG. 2 shows, a non-limiting example of two reactors, reactor 21 and reactor 22. The shape, design or the number of the reactor(s) is not particularly important to the success of this invention. For example, unstirred or stirred spherical, cylindrical or tank-like vessels could be utilized, as well as recirculating loop reactors or tubular reactors. In another embodiment, after the second reactor shown in FIG. 2, reactor 22, one or more tubular reactors could be added, as describe in U.S. Pat. No. 8,101,693 issued Jan. 24, 2012 to Van Asseldonk et al., assigned to NOVA Chemicals (International) S.A.

As shown in FIG. 2, fresh feeds are also injected into reactor 22. Solvent 16, ethylene 17 and optional α-olefin 18 are combined to produce reactor feed RF2, which is injected into reactor 22. Catalyst is injected into reactor 22 through line 19. Optionally hydrogen 20 may be injected into reactor 22.

The continuous solution polymerization reactors 21 and 22, shown in FIG. 2, may be operated over a wide range of temperatures and pressures. For example, the upper limit on reactor temperature may be 300° C., in some cases 280° C., and in other cases 260° C.; and the lower limit on reactor temperature may be 80° C., in some cases 100° C., and in other cases 125° C. Typically, reactor 22 (the second reactor) is operated at a slightly higher temperature than reactor 21; e.g., reactor 22 is typically 5° C. to 25° C. hotter than reactor 21. The reactor residence time is typically less than 15 minutes and in some cases less than 10 minutes. The operating pressure of reactor 21 and 22 can vary over a wide range. For example, the upper limit on reactor pressure may be 45 MPa, in some cases 30 MPa, and in other cases 20 MPa; and the lower limit on reactor pressure may be 3 MPa, in some cases 5 MPa, and in other cases 7 MPa.

The continuous solution polymerization reactors 21 and 22, shown in FIG. 2, produce stream 23 which contains an ethylene polymer in a single liquid phase solution (or two liquid phases). Stream 23 may also contain unreacted ethylene, active catalyst, deactivated catalyst, optional unreacted α-olefin, optional unreacted hydrogen and light-end impurities if present. Tank 24 contains a catalyst deactivator dissolved, or slurried, in a solvent; non-limiting examples of suitable solvents include linear or branched $C_5$ to $C_{12}$ alkanes. Catalyst deactivators are well known in the art, non-limiting examples include: amines; alkali or alkaline earth metal salts of carboxylic acids; water; hydrotalcites; alcohols, and; carboxylic acids. In general, the catalyst deactivators is added in the minimal amount required to substantially deactivate the catalyst and quench the polymerization reaction. A minimal amount of catalyst deactivator minimizes cost and minimizes the amount of un-reacted catalyst deactivator present in process streams.

Injection of the catalyst deactivator into the process produces a deactivated reactor solution, stream 25. Stream 25 passes through pressure let down device 26, heat exchanger 27, pressure let down device 28 and enters V/L separator 29. Prior to entering the V/L separator, the deactivated reactor solution may have a maximum temperature of 300° C., in some cases 290° C. and in other cases 280° C.; while the minimum temperature of the deactivated reactor solution prior to entering the V/L separator could be 150° C., in some cases 200° C. and in other cases 220° C. Prior to entering the V/L separator, the deactivated reactor solution may have a maximum pressure of 40 MPa, in some cases 25 MPa, and in other cases 15 MPa; while the minimum pressure could be 1.5 MPa, in some cases 5 MPa, and in other cases 6 MPa.

In the V/L separator two streams are formed: a bottom stream 30, comprised of an ethylene polymer rich solvent, deactivated catalyst and optional α-olefin, and; a gaseous overhead stream 31 comprised of ethylene, solvent, oligomers, optional α-olefins, optional hydrogen and light-end impurities if present. V/L separator 29 may be operated over a relatively broad range of temperatures and pressures. For example, the maximum operating temperature of the V/L separator may be 300° C., in some cases 285° C., and in other cases 270° C.; while the minimum operating temperature of the V/L separator may be 100° C., in some cases 140° C. and in other cases 170° C. The maximum operating pressure of the V/L separator may be 20 MPa, in some cases 10 MPa, and in other cases 5 MPa; while the minimum operating pressure of the V/L separator may be 1 MPa, in some cases 2 MPa, and in other cases 3 MPa.

As shown in FIG. 2, the gaseous overhead stream 31 is split into two streams, FL1 and FL2, using flow controllers 32 and 33, respectively. Not more than 40% of the gaseous overhead stream 31 is sent via stream FL1 to a distillation train. The remainder of the gaseous overhead stream, stream FL2, flows through a halide removal column 34 to remove compounds such as organic chlorides and HCl. Non-limiting examples of adsorbents to remove such halides include: AZ-300 adsorbent, PCL-100 adsorbent or CLR-300 adsorbent; all of these adsorbents are available from UOP LLD, A Honeywell Company, 25 East Algonquin Road, Des Plaines, Ill. AZ-300 is a homogeneous combination of modified activated alumina and zeolitic molecular sieve absorbents. PCL-100 and CLR-300 are activated alumina absorbents. The halide removal column containing AZ-300, PCL-100 or CLR-300 may or may not be regenerable. Experienced artisans will realize that the amount of halide in the gaseous overhead stream depends on the catalyst system used (suitable catalyst systems are discussed below). For example: in an embodiment where a single site catalyst system is used, the halide removal column 34 may be optional, i.e., not required; in another embodiment where a Ziegler-Natta catalyst system is used, two halide removal columns may be required. In the latter case (Ziegler-Natta catalyst), one embodiment would be parallel halide removal columns 34a and 34b (not shown in FIG. 2); for example, halide removal column 34a could be on-line (converting stream FL2 into stream 35), while halide removal column 34b is off-line for regeneration or for replacement of the exhausted adsorption medium if regenerable. Another halide removal embodiment would be a single halide removal column 34 with a by-pass line (not shown in FIG. 2). More specifically: in by-pass mode, stream FL2 is rerouted through the by-pass line and flows directly into stream 35, this allows the halide removal column 34 to be taken off-line for regeneration or replacement of the exhausted adsorption medium if not regenerable; in normal operating mode, stream FL2 flows through the halide removal column 34, as shown in FIG. 2.

Halide-free stream 35, passes through recycle condenser 36 producing a condensed overhead stream 37. Depending on the solution polymerization plant operational circumstances, the condensed overhead stream may be partially condensed (i.e. stream 37 may contain a mixture of condensed liquid and uncondensed gas). The condensed overhead steam 37 may have a maximum temperature of 180° C., in some cases 170° C. and in other cases 160° C.; while the minimum temperature of the condensed overhead stream may be 145° C., in some cases 150° C., and in other cases 155° C. The maximum pressure of the condensed overhead stream may be 5 MPa, in some cases 4 MPa and in other cases 3 MPa; while the minimum pressure of the condensed overhead stream may be 0.5 MPa, in some cases 1 MPa, and in other cases 1.2 MPa.

Condensed overhead stream 37 then passes through a means for oligomer removal 38 producing a cold recycle stream 41. Depending on operational circumstances, the cold recycle stream may have a maximum temperature of 60° C., in some cases 50° C. and in other cases 30° C.; while the minimum temperature of the cold recycle stream may be −25° C., in some cases −10° C., and in other cases 0° C. The maximum pressure of the cold recycle stream may be 5 MPa, in some cases 4 MPa and in other cases 3 MPa; while the minimum pressure of the cold recycle stream may be 0.5 MPa, in some cases 1 MPa, and in other cases 1.2 MPa.

A non-limiting example of a means for oligomer removal consists of two parallel heat exchangers, as shown in FIG. 2. The parallel configuration allows one of the heat exchangers to be taken off-line and flushed with hot process solvent to remove oligomers that have deposited on heat transfer surfaces. For example, while heat exchanger 38a is on-line (converting stream 37 into stream 41), heat exchanger 38b can be taken off-line and flushed with hot process solvent (stream 39). Hot flushing dissolves the oligomers trapped in heat exchanger 38b and the oligomers exit the means for oligomer removal 38 via stream 40. The temperature of the solvent for hot flushing can vary over a wide range; for example the maximum solvent temperature could be 300° C., in some cases 270° C. and in other cases 240° C.; while the minimum solvent temperature could be 60° C., in some cases 90° C. and in other cases 120° C. Oligomers deposit (and foul) on the surfaces of heat exchangers as the process stream 37 is cooled. Synonyms for the term "oligomer" include "wax" or "grease", such materials are very low molecular weight ethylene polymers that flash off with the process solvent in the V/L separator and are carried over in gaseous overhead stream 31.

Alternative embodiments of an oligomer removal means include more than two parallel heat exchanges; wherein each heat exchanger is adapted such that it may be operated in one of two modes: 1) on-line (converting stream 37 into stream 41), or; 2) off-line for flushing. An alternative embodiment of a means for oligomer removal consists of at least two parallel scraped surface heat exchangers. The parallel configuration allows one of the scraped surface heat exchanges to be taken off-line, rotationally scraped and flushed with process solvent to remove oligomers from the solution polymerization process. An alternative embodiment of an oligomer removal means includes a separation tower; wherein oligomers or an oligomer rich stream is removed at the bottom of the tower (heavies), and the cold recycle stream 41 exits the top of the tower (lights). An alternative embodiment of an oligomer removal means includes a knock-out tank. The knock-out tank, or drum-like vessel, collects the heavier, less volatile or less soluble oligomers in the bottom of the knock-out tank. An oligomer rich stream could be withdrawn from the knock-out tank continuously, or the knock-out tank could be purged in a batch-like fashion, as necessary, to remove the oligomers.

The cold recycle stream passes through lights separator 42, wherein light-end impurities with low boiling points are removed from the process via stream 43 and a purged recycle stream 44 is formed. Non-limiting examples of light-end impurities include hydrogen, nitrogen, CO, $CO_2$, methane and ethane.

The purged recycle stream flows through level controller 45 and enters a purification step; wherein water, CO, $CO_2$ and oxygenate (e.g. fatty acid, ketone and aldehyde) impurities are removed. Such impurities are potential catalyst poisons. As shown in FIG. 2, a non-limiting example of the purification step includes at least two purification vessels 46a and 46b. The parallel configuration allows one of the purification vessels to remain on line (converting stream 44 into stream 47) while the other purification vessel is taken off-line to be regenerated; if not regenerable the adsorbing media can be replaced. Adsorbent materials and methods to remove such impurities from hydrocarbon streams are well known to experienced artisans. Non-limiting examples of suitable adsorbents include: AZ-300 available from UOP LLD, A Honeywell Company, 25 East Algonquin Road, Des Plaines, Ill., USA; Selexsorb CD available from Almantis AC Inc., 109 Highway 131, Vidalia, La., USA; or Selexsorb CDX. AZ-300, a regenerable adsorbent, is a homogeneous combination of a modified activated alumina adsorbent and a zeolitic molecular sieve absorbent. Selexsorb CD and CDX, both regenerable adsorbents, are activated alumina. An alternative, non-limiting example to purify stream 44 is at least two purification trains (the term "train" denotes multiple purification vessels connected in series); wherein each train comprises at least three purification vessels containing the following adsorbents: a water adsorbing molecular sieve; a $CO_2$ adsorbing activated alumina (e.g. CG-731, available from UOP LLD), and; an oxygenate adsorbing material (e.g. AZ-300, or Selexsorb CD or Selexsorb CDX). At least two parallel distillation trains allow one purification train to remain on-line (converting stream 44 into stream 47) while the other purification train is regenerated, or one or more of the adsorbent materials are replaced in the off-line train. Provided that the catalyst deactivating impurities are removed in the purification step; the number of purification vessels and adsorbents used are not particularly important to the success of this invention.

As shown in FIG. 2, after passing through the purification step (vessels 46a and 46b) a purified recycle stream 47 is formed. Optionally, the purified recycle stream flows through analytical device 48 where the chemical composition of stream 47 is determined. The purified recycle stream is collected in recycle drum 49. Depending on operational circumstances, the recycle drum may have a maximum temperature of 60° C., in some cases 50° C. and in other cases 30° C.; while the minimum temperature of the recycle drum may be −25° C., in some cases −10° C., and in other cases 0° C. The maximum pressure of the recycle drum may be 3 MPa, in some cases 2 MPa and in other cases 1 MPa; while the minimum pressure of the recycle drum may be 0.1 MPa, in some cases 0.2 MPa, and in other cases 0.3 MPa.

As shown in FIG. 2, the purified recycle stream in recycle drum 49 is passed through a pump 50, forming a high pressure recycle stream 51. The high pressure recycle stream may have a maximum temperature of 120° C., in some cases 80° C. and in other cases 60° C.; while the minimum temperature of the high pressure recycle stream may be −20° C., in some cases −10° C., and in other cases 0° C. The maximum pressure of the high pressure recycle stream may be 45 MPa, in some cases 35 MPa and in other cases 25 MPa; while the minimum pressure of the high pressure recycle stream may be 3 MPa, in some cases 4 MPa, and in other cases 6 MPa.

One or more flow controllers are used to distribute the high pressure recycle stream to one or more upstream reactors. FIG. 2 illustrates a non-limiting example showing two upstream reactors, reactor 21 and reactor 22. In FIG. 2, 0 to 100% of high pressure recycle stream 51 passes through flow controller 52, forming recycle stream RC1 which is combined with reactor feed stream RF1 and injected into the first upstream reactor 21; the remaining high pressure stream 51 passes through flow controller 53, forming recycle stream RC2 which is combined with reactor feed stream RF2 and injected into the second upstream reactor 22. Optionally, recycle streams RC1 and RC2 may be flow controlled, as desired, directly into reactor 21 and 22, respectively.

Figure 3:
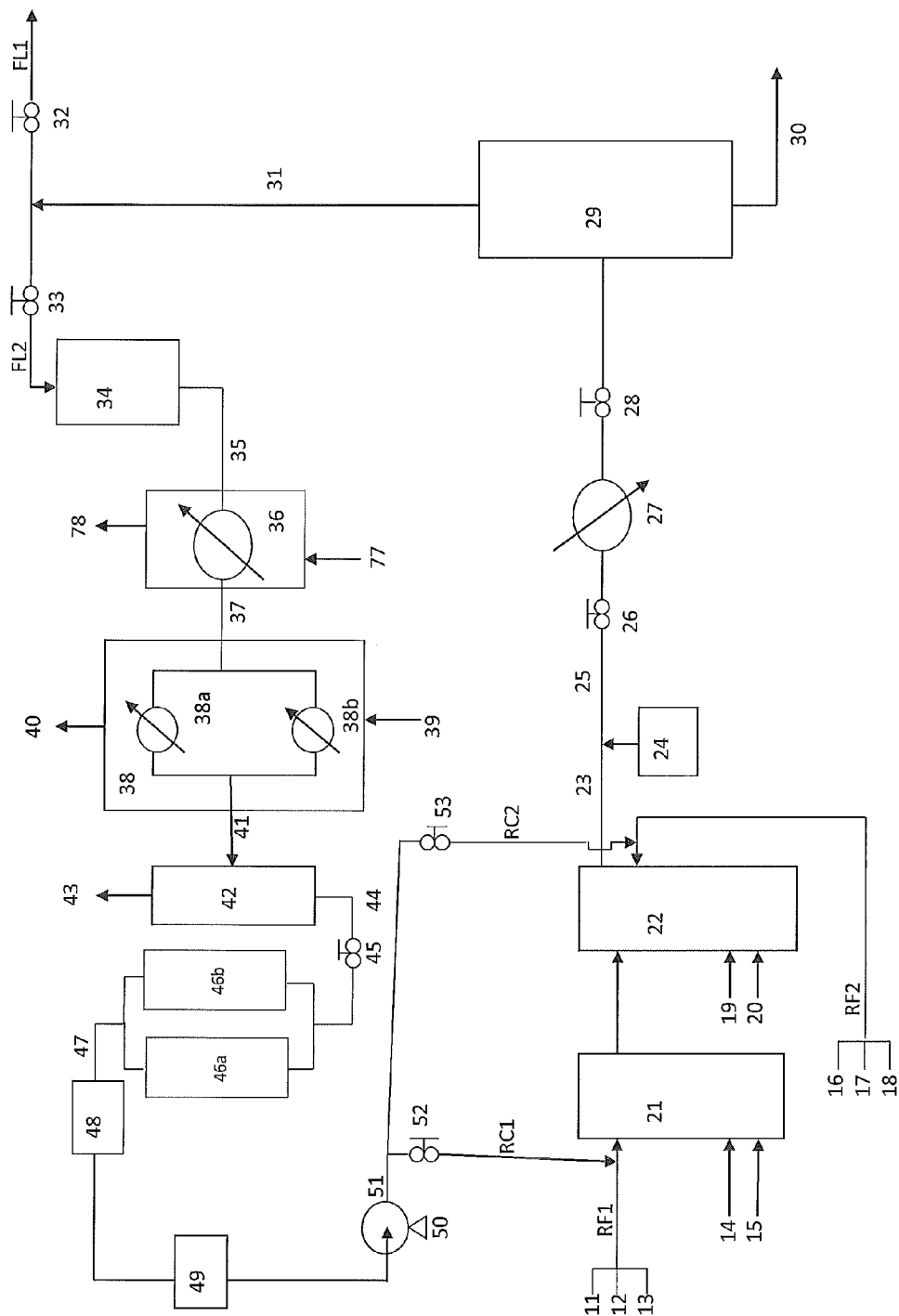
FIG. 3 is a schematic diagram of one embodiment of an inventive continuous solution polymerization process where a portion of the gaseous overhead stream 31 is recycled to at least one upstream reactor and low pressure steam 78 is generated.

An additional embodiment of this invention is shown in FIG. 3. In FIG. 3 low pressure steam 78 is generated as the gaseous overhead stream is condensed in condenser 36. For the sake of clarity, many of the vessels and streams shown in FIG. 3 are equivalent to the respective vessels and streams shown in FIG. 2; equivalence is indicated through the use of a consistent vessel label or stream label. In addition, the operational ranges, e.g. temperature and pressure, for the vessels and streams shown in FIG. 3 are equivalent to the ranges recited in the description of FIG. 2 (above).

Referring to FIG. 3, halide-free stream 35, passes through recycle condenser 36 producing a condensed overhead stream 37. Depending on plant operational circumstances, the condensed overhead stream may be partially condensed (i.e. stream 37 may contain a mixture of condensed liquid and uncondensed gas). The condensed overhead steam 37 may have a maximum temperature of 180° C., in some cases 170° C. and in other cases 160° C.; while the minimum temperature of the condensed overhead stream may be 145° C., in some cases 150° C., and in other cases 155° C. The maximum pressure of the condensed overhead stream may be 5 MPa, in some cases 4 MPa and in other cases 3 MPa; while the minimum pressure of the condensed overhead stream may be 0.5 MPa, in some cases 1 MPa, and in other cases 1.2 MPa.

In FIG. 3, as steam 35 is being condensed, low pressure condensate 77 is converted to low pressure steam 78. In this embodiment, the solution polymerization process generates more low pressure steam then it can consume; thus the solution polymerization plant becomes a net exporter of energy.

The catalysts suitable for use in the present invention are not particularly limited. The invention can be used with any single site catalyst (SSC), Ziegler-Natta catalyst, chromium catalyst or any other organometallic catalyst capable of polymerizing olefins in a solution process. Generally, the catalyst components may be premixed in the process solvent or fed as separate streams to each reactor. In some instances premixing catalyst components may be desirable to provide a reaction time for the catalyst components prior to entering the reaction. Such an "in line mixing" technique is described in a number of patents in the name of DuPont Canada Inc (e.g. U.S. Pat. No. 5,589,555, issued Dec. 31, 1996).

The term "Ziegler-Natta catalyst" is well known to those skilled in the art and is used herein to convey its conventional meaning. Ziegler-Natta catalysts are suitable for injection through lines 14 and 19 in FIGS. 1, 2 and 3. Ziegler-Natta catalyst systems comprise: at least one transition metal compound wherein the transition metal is selected from groups 3, 4 or 5 of the Periodic Table (using IUPAC nomenclature), non-limiting examples include $TiCl_4$ and titanium alkoxides $(Ti(OR_1)_4)$ where $R_1$ is a lower $C_{1-4}$ alkyl radical; and an organoaluminum component, which is defined by $(Al(X')_a(OR_2)_b(R_3)_c)$, wherein, X' is a halide (preferable chlorine), $OR_2$ is an alkoxy or aryloxy group; $R_3$ is a hydrocarbyl (preferably an alkyl having from 1 to 10 carbon atoms) and a, b, or c are each 0, 1, 2 or 3 with the provisos, a+b+c=3 and b+c=1. As will be appreciated by those skilled in the art, conventional Ziegler Natta catalysts frequently incorporate additional components. For example, an amine or a magnesium compound or a magnesium alkyl such as butyl ethyl magnesium and a halide source (which is typically a chloride, e.g. tertiary butyl chloride). The Ziegler-Natta catalyst may also include an electron donor, e.g., an ether such as tetrahydrofuran, etc. Such components, if employed, may be added to the other catalyst components prior to introduction to the reactor or may be directly added to the reactor. The Ziegler Natta catalyst may also be "tempered" (i.e. heat treated) prior to being introduced to the reactor (again, using techniques which are well known to those skilled in the art and published in the literature). There is a large amount of art disclosing these catalyst and the components and the sequence of addition may be varied over broad ranges.

Single site catalysts are also suitable catalysts for injection through lines 14 and 19 in FIGS. 1, 2 and 3. The term "single site catalyst" refers to a catalyst system that produces homogeneous ethylene polymers; which may or may not contain long chain branching. There is a large amount of art disclosing single site catalyst systems, a non-limiting example includes the bulky ligand single site catalyst of the formula:

$$(L)_n\text{-M-}(Y)_p$$

wherein M is selected from the group consisting of Ti, Zr, and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon, said bulky heteroatom ligand being sigma or pi-bonded to M; Y is independently selected from the group consisting of activatable ligands; n may be from 1 to 3; and p may be from 1 to 3, provided that the sum of n+p equals the valence state of M, and further provided that two L ligands may be bridged.

Non-limiting examples of bridging groups include bridging groups containing at least one Group 13 to 16 atom, often referred to as a divalent moiety such as, but not limited to, at least one of a carbon, oxygen, nitrogen, silicon, boron, germanium and tin atom or a combination thereof. Preferably the bridging group contains a carbon, silicon or germanium atom, most preferably at least one silicon atom or at least one carbon atom. The bridging group may also contain substituent radicals, including halogens.

Some bridging groups include but are not limited to a di $C_{1-6}$ alkyl radical (e.g. alkylene radical for example an ethylene bridge), di $C_{6-10}$ aryl radical (e.g. a benzyl radical having two bonding positions available), silicon or germanium radicals substituted by one or more radicals selected from the group consisting of $C_{1-6}$ alkyl, $C_{6-10}$ aryl, phosphine or amine radical which are unsubstituted or up to fully substituted by one or more $C_{1-6}$ alkyl or $C_{6-10}$ aryl radicals, or a hydrocarbyl radical such as a $C_{1-6}$ alkyl radical or a $C_{6-10}$ arylene (e.g. divalent aryl radicals); divalent $C_{1-6}$ alkoxide radicals (e.g. $—CH_2CHOHCH_2—$) and the like.

Exemplary of the silyl species of bridging groups are dimethylsilyl, methylphenylsilyl, diethylsilyl, ethylphenylsilyl or diphenylsilyl compounds. Most preferred of the bridged species are dimethylsilyl, diethylsilyl and methylphenylsilyl bridged compounds.

Exemplary hydrocarbyl radicals for bridging groups include methylene, ethylene, propylene, butylene, phenylene and the like, with methylene being preferred.

Exemplary bridging amides include dimethylamide, diethylamide, methylethylamide, di-t-butylamide, diisopropylamide and the like.

The term "cyclopentadienyl", frequently abbreviated as "Cp", refers to a 5-member carbon ring having delocalized bonding within the ring and typically being bound to the active catalyst site, generally a group 4 metal (M) through $\eta_5$-bonds. The cyclopentadienyl ligand may be unsubstituted or up to fully substituted with one or more substituents selected from the group consisting of $C_{1-10}$ hydrocarbyl radicals in which hydrocarbyl substituents are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $—Si—(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula $—Ge—(R)_3$ wherein R is as defined above.

Typically, the cyclopentadienyl-type ligand is selected from the group consisting of a cyclopentadienyl radical, an indenyl radical and a fluorenyl radical where the radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

If none of the L ligands is bulky heteroatom ligand then the catalyst could be a bis-Cp catalyst (a traditional metallocene) or a bridged constrained geometry type catalyst or tris-Cp catalyst.

If the catalyst contains one or more bulky heteroatom ligands the catalyst would have the formula:

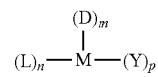

wherein M is a transition metal selected from the group consisting of Ti, Hf and Zr; D is independently a bulky heteroatom ligand (as described below); L is a monoanionic ligand selected from the group consisting of cyclopentadienyl-type ligands; Y is independently selected from the group consisting of activatable ligands; m is 1 or 2; n is 0, 1 or 2; p is an integer; and the sum of m+n+p equals the valence state of M, provided that when m is 2, D may be the same or different bulky heteroatom ligands.

For example, the catalyst may be a bis(phosphinimine), or a mixed phosphinimine ketimide dichloride complex of titanium, zirconium or hafnium. Alternately, the catalyst could contain one phosphinimine ligand or one ketimide ligand, one "L" ligand (which is most preferably a cyclopentadienyl-type ligand) and two "Y" ligands (which are preferably both chloride).

The preferred metals (M) are from Group 4 (especially titanium, hafnium or zirconium) with titanium being most preferred. In one embodiment the catalysts are group 4 metal complexes in the highest oxidation state.

Bulky heteroatom ligands (D) include but are not limited to phosphinimine ligands (PI) and ketimide (ketimine) ligands.

The phosphinimine ligand (PI) is defined by the formula:

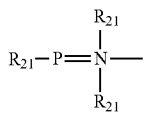

wherein each $R_{21}$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula: —Si—$(R_{22})_3$, wherein each $R_{22}$ is independently selected from the group consisting of hydrogen, a $C_{1-8}$ alkyl or alkoxy radical, and $C_{6-10}$ aryl or aryloxy radicals; and a germanyl radical of the formula: —Ge—$(R_{22})_3$, wherein $R_{22}$ is as defined above.

The preferred phosphinimines are those in which each $R_{21}$ is a hydrocarbyl radical, preferably a $C_{1-6}$ hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents $Sub_1$ and $Sub_2$ (described below) which are bonded to the carbon atom.

Conditions a, b and c are illustrated below:

Where the substituents $Sub_1$ and $Sub_2$ may be the same or different and may be further bonded together through a bridging group to form a ring. Exemplary substituents include hydrocarbyls having from 1 to 20 carbon atoms, preferably from 3 to 6 carbon atoms, silyl groups (as described below), amido groups (as described below) and phosphido groups (as described below). For reasons of cost and convenience it is preferred that these substituents both be hydrocarbyls, especially simple alkyls and most preferably tertiary butyl.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contain at least one heteroatom selected from the group consisting of boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula: —(Y)Si$R_xR_yR_z$ wherein the - denotes a bond to the transition metal and Y is sulfur or oxygen. The substituents on the Si atom, namely $R_x$, $R_y$ and $R_z$, are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" are also intended to convey their conventional meanings. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical where the radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. Phospholes are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The current invention also contemplates the use of chromium catalysts that are also well known in the art. The term "chromium catalysts" describes olefin polymerization catalysts comprising a chromium species, such as silyl chromate, chromium oxide, or chromocene on a metal oxide support such as silica or alumina. Suitable cocatalysts for chromium catalysts, are well known in the art, non-limiting examples include trialkylaluminum, alkylaluminoxane, dialkoxyalkylaluminum compounds and the like.

EXAMPLES

The present invention will now be illustrated by the following non limiting examples. Computer simulations of the embodiments of this invention were performed using Aspen Plus v7.1 and v7.2 computer software available from AspenTech. A second software program, VLXE, an Excel-based thermodynamic program from the VLXE company, was used as a supplemental program. AspenTech's Aspen Simulation Workbook program was used for programming the data exchange between Excel and the Aspen software.

Aspen Plus and VLXE were used to model a portion of the plant from reactor outlet through distillation and recovery, but excluding polymer-finishing operations. Extensive data was gathered from plant data historians, sampling, and field instruments and was used to benchmark the Aspen Plus/VLXE model in order to develop a steady-state base case model that closely models typical process conditions for the portion of the plant modeled. For the base case, FIG. 1, energy consumption was calculated. This was done by summing the energy consumed by all discrete users in the form of: low pressure steam (kW), hereafter LP steam; high pressure steam (kW), hereafter HP steam; and Power (kW). Users included all major energy consumers, e.g., heat exchangers, pumps and air cooler fans, etc. The base case simulation model was then modified to simulate the inventive embodiments shown in FIGS. 2 and 3.

The embodiment shown in FIG. 2 includes the partial recycle of a gaseous overhead stream 31 back to the upstream reactors. The embodiment shown in FIG. 3 includes the partial recycle of a gaseous overhead stream 31 back to the upstream reactors, as well as the generation of low pressure steam 78 in recycle condenser 36. For the two embodiments shown in FIGS. 2 and 3, the energy consumption (kW) for each utility (LP steam, HP steam and Power) was calculated as before, by summing the various users within the model scope.

Recycle of the gaseous overhead stream from the V/L separator without LP steam generation results in reduced energy consumption for all users, due to the reduced flow to distillation. Table 1 summarizes the savings. Specifically, in the embodiment shown in FIG. 2, for an 80% recycle case; wherein 80% of gaseous overhead stream 31 is recycled to the upstream reactors with the remainder sent to distillation via stream FL1. In this embodiment the energy reductions were: LP steam usage was reduced by 20%; HP steam usage was reduced by 44%, and; Power usage was reduced by 65%. Table 1 documents the flows via each route, as a percentage of maximum possible flow.

Table 1 also summarizes the energy saved for the embodiment shown in FIG. 3; wherein 80% of gaseous overhead stream 31 is recycled back to the upstream reactors and low pressure steam is generated as the gaseous overhead stream is condensed in recycle condenser 36. Relative to FIG. 1 (the base case), the energy consumed by the embodiment shown in FIG. 3 is reduced due to the reduced distillation load and LP steam generation. In addition, the continuous solution polymerization plant becomes a net exporter of LP steam. In other words, LP steam is produced and exported, resulting in net generation of this utility. As shown in Table 1, the energy reductions for this embodiment are as follows: LP steam usage is reduced by 201% (meaning that approximately twice as much steam is generated as is used in the base case); HP steam usage is reduced by 44% and Power usage is reduced by 64%. Table 1 documents the flows via each route, as a percentage of maximum possible flow.

A portion of the LP steam generated by the embodiment shown in FIG. 3 can be utilized within solution polyethylene plant operations that were not included in the modeling envelope. Simulations show that about one-third to one-half of the LP steam generated in FIG. 3 embodiment could be used within the solution polyethylene plant; the remaining low pressure steam can be exported to other petrochemical operations within an integrated complex.

TABLE 1

Process flows and energy saved in the inventive embodiments shown in FIGS. 2 and 3, relative to the base case FIG. 1

|  | Base Case (FIG. 1) | Recycle (FIG. 2) | Recycle with Low Pressure Steam Generation (FIG. 3) |
| --- | --- | --- | --- |
| Process Flow | % of Maximum Flow by this Route | | |
| FL1 | 100% | 20% | 20% |
| FL2 | 0% | 80% | 80% |
| RC1 | 0% | 0-100% | 0-100% |
| RC2 | 0% | 0-100% | 0-100% |
| RF1 | 100% | 20% | 20% |
| RF2 | 100% | 20% | 20% |
| Energy Savings | % of Energy (kW) Saved | | |
| LP Steam | 0% | 20% | 201% |
| HP Steam | 0% | 44% | 44% |
| Power | 0% | 65% | 64% |

INDUSTRIAL APPLICABILITY

The industrial applicability of this invention is a continuous solution polymerization process that consumes less energy; as a result, manufacturing variable costs are reduced and the environment benefits due to a reduction in greenhouse gas emissions.

The invention claimed is:

1. An improved continuous solution polymerization process wherein energy consumption is reduced, comprising:
   i) injecting ethylene, one or more aliphatic hydrocarbon solvents, a first catalyst, optionally one or more α-olefins and optionally hydrogen into a first upstream reactor operating at a temperature and a pressure to produce an ethylene polymer in a single liquid phase solution; optionally, more than one upstream reactor may be employed, with the proviso that ethylene, one or more aliphatic hydrocarbon solvents, a second catalyst, optional one or more α-olefins and optional hydrogen are independently injected into said more than one upstream reactor to produce an ethylene polymer in a single liquid phase solution; wherein said first catalyst and said second catalyst may be the same or different;
   ii) injecting a catalyst deactivator, downstream of said first upstream reactor, or optionally downstream of said more than one upstream reactor, into the single liquid phase solution containing ethylene, solvents, catalyst, ethylene polymer, optional α-olefins and optional hydrogen, to form a deactivated reactor solution;

iii) passing the deactivated reactor solution through a heat exchanger to increase the temperature, followed by reducing the pressure, followed by producing a bottom stream of ethylene polymer rich solvents, deactivated catalyst and optional α-olefins and a gaseous overhead stream of ethylene, solvents, oligomers, optional α-olefins, and optional hydrogen in a V/L separator;

iv) passing not more than 40% of the gaseous overhead stream to a distillation column;

v) passing the remainder of the gaseous overhead stream through a halide removal column, followed by condensing the gaseous overhead stream by reducing the temperature, to form a condensed overhead stream having a temperature from 145° C. to 180° C. and a pressure from 0.5 MPa to 5 MPa;

vi) passing the condensed overhead stream through a means for oligomer removal, producing a cold recycle stream having a temperature from −25° C. to 60° C.;

vii) passing the cold recycle stream through a lights separator to remove volatile components to produce a purged recycle stream;

viii) passing the purged recycle stream through at least two purification vessels, producing a purified recycle stream;

ix) collecting the purified recycle stream in a recycle drum, passing the purified recycle stream through pump and injecting a high pressure recycle stream into said first upstream reactors or optionally more than one upstream reactor; wherein said high pressure recycle stream has a pressure from 3 to 45 MPa, with the proviso that said high pressure recycle stream has a higher pressure than said first upstream reactor.

2. The process according to claim 1, wherein said first upstream reactor, or optionally more than one upstream reactor, are operated at a temperature from 100° C. to 300° C. and a pressure from 3 MPa to 45 MPa.

3. The process according to claim 2, wherein said first upstream reactor, or optionally more than one upstream reactor, are operated at a temperature from 125° C. to 270° C.

4. The process according to claim 3, wherein said first upstream reactor, or optionally more than one upstream reactor, are operated at pressures from 6 MPa to 20 MPa.

5. The process according to claim 4, wherein the temperature of the deactivated reactor solution is from 150° C. to 300° C. at the exit of said heat exchanger in step iii).

6. The process according to claim 5, wherein the temperature of the deactivated reactor solution is from 220° C. to 280° C. at the exit of said heat exchanger in step iii).

7. The process according to claim 6, wherein the temperature of said V/L separator is from 100° C. to 300° C.

8. The process according to claim 7, wherein the pressure of said V/L separator is form 1 MPa to 20 MPa.

9. The process according to claim 8, wherein the aliphatic hydrocarbon solvents are one or more C5 to C12 alkanes; wherein the alkanes are linear or branched.

10. The process according to claim 9, wherein the optional α-olefins are one or more C4 to C8 α-olefins.

11. The process according to claim 10, wherein the optional α-olefin is selected from the group consisting of 1-hexene and 1-octene.

12. The process according to claim 11, wherein 0% to 100% of the high pressure recycle stream, formed in step ix), is fed to said first upstream reactor, and the remaining high pressure recycle stream is fed to a second upstream reactor.

13. The process according to claim 12, wherein said first catalyst is a first heterogeneous catalyst and said second catalyst is a second heterogeneous catalyst; wherein said first and second heterogeneous catalyst may be the same or different.

14. The process according to claim 12, wherein said first catalyst is a homogeneous catalyst and said second catalyst is a second homogeneous catalyst; wherein said first and second homogeneous catalyst may be the same or different.

15. The process according to claim 12, wherein said first catalyst is a homogeneous catalyst and said second catalyst is a heterogeneous catalyst.

16. An improved continuous solution polymerization process wherein energy consumption is reduced, comprising:

i) injecting ethylene, one or more aliphatic hydrocarbon solvents, a first catalyst, optionally one or more α-olefins and optionally hydrogen into a first upstream reactor operating at a temperature and a pressure to produce an ethylene polymer in a single liquid phase solution; optionally, more than one upstream reactor may be employed, with the proviso that ethylene, one or more aliphatic hydrocarbon solvents, a second catalyst, optional one or more α-olefins and optional hydrogen are independently injected into said more than one upstream reactor to produce an ethylene polymer in a single liquid phase solution; wherein said first catalyst and said second catalyst may be the same or different;

ii) injecting a catalyst deactivator, downstream of said first upstream reactor or optionally downstream of said more than one upstream reactor, into the single liquid phase solution containing ethylene, solvents, catalyst, ethylene polymer, optional α-olefins and optional hydrogen, to form a deactivated reactor solution;

iii) passing the deactivated reactor solution through a heat exchanger to increase the temperature, followed by reducing the pressure, followed by producing a bottom stream of ethylene polymer rich solvents, deactivated catalyst and optional α-olefins and a gaseous overhead stream of ethylene, solvents, oligomers, optional α-olefins, and optional hydrogen in a V/L separator;

iv) passing not more than 40% of the gaseous overhead stream to a distillation column;

v) passing the remainder of the gaseous overhead stream through a halide removal column, followed by condensing the gaseous overhead stream by reducing the temperature while simultaneously generating a low pressure steam stream, to form a condensed overhead stream having a temperature from 145° C. to 180° C. and a pressure from 0.5 MPa to 5 MPa;

vi) passing the condensed overhead stream through a means for oligomer removal, producing a cold recycle stream having a temperature from −25° C. to 60° C.;

vii) passing the cold recycle stream through a lights separator to remove volatile components to produce a purged recycle stream;

viii) passing the purged recycle stream through at least two purification vessels, producing a purified recycle stream;

ix) collecting the purified recycle stream in a recycle drum, passing the purified recycle stream through pump and injecting a high pressure recycle stream into said first upstream reactors or optionally more than one upstream reactor; wherein said high pressure recycle stream has a pressure from 3 to 45 MPa, with the proviso that said high pressure recycle stream has a higher pressure than said first upstream reactor.

17. The process according to claim 16, wherein said first upstream reactor, or optionally more than one upstream reactor, are operated at a temperature from 100° C. to 300° C. and a pressure from 3 MPa to 45 MPa.

18. The process according to claim 17, wherein said first upstream reactor, or optionally more than one upstream reactor, are operated at a temperature from 125° C. to 270° C.

19. The process according to claim 18, wherein said first upstream reactor, or optionally more than one upstream reactor, are operated at pressures from 6 MPa to 20 MPa.

20. The process according to claim 19, wherein the temperature of the deactivated reactor solution is from 150° C. to 300° C. at the exit of said heat exchanger in step iii).

21. The process according to claim 20, wherein the temperature of the deactivated reactor solution is from 220° C. to 280° C. at the exit of said heat exchanger in step iii).

22. The process according to claim 21, wherein the temperature of said V/L separator is from 100° C. to 300° C.

23. The process according to claim 22, wherein the pressure of said V/L separator is form 1 MPa to 20 MPa.

24. The process according to claim 23, wherein said low pressure steam stream, formed in step v), is exported from said continuous solution polymerization process and passed through a means for energy recovery.

25. The process according to claim 24, wherein the aliphatic hydrocarbon solvents are one or more C5 to C12 alkanes, wherein the alkanes are linear or branched.

26. The process according to claim 25, wherein the optional α-olefins are one or more C4 to C8 α-olefins.

27. The process according to claim 26, wherein the optional α-olefin is selected from the group consisting of 1-hexene and 1-octene.

28. The process according to claim 27, wherein 0% to 100% of the high pressure recycle stream, formed in step ix), is fed to said first upstream reactor, and the remaining high pressure recycle stream is fed to a second upstream reactor.

29. The process according to claim 28, wherein said first catalyst is a first heterogeneous catalyst and said second catalyst is a second heterogeneous catalyst; wherein said first and second heterogeneous catalyst may be the same or different.

30. The process according to claim 28, wherein said first catalyst is a homogeneous catalyst and said second catalyst is a homogeneous catalyst;
   wherein said first and second homogeneous catalyst may be the same or different.

31. The process according to claim 28, wherein said first catalyst is a homogeneous catalyst and said second catalyst is a heterogeneous catalyst.

* * * * *